Sept. 20, 1938.                C. K. EDWARDS                2,130,951
                      LOADING APPARATUS FOR VEHICLES
                          Filed May 3, 1937            4 Sheets-Sheet 4
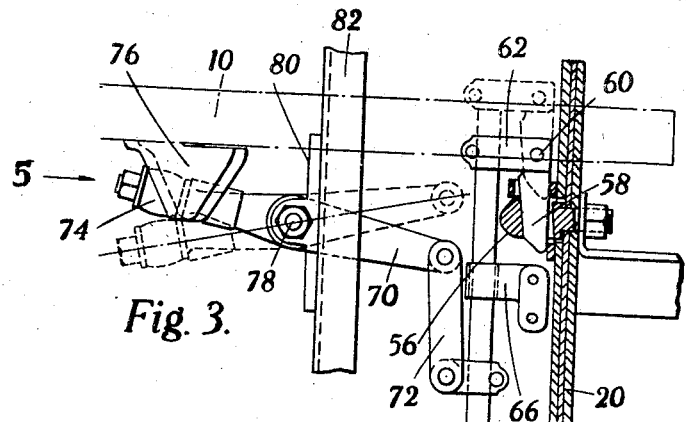
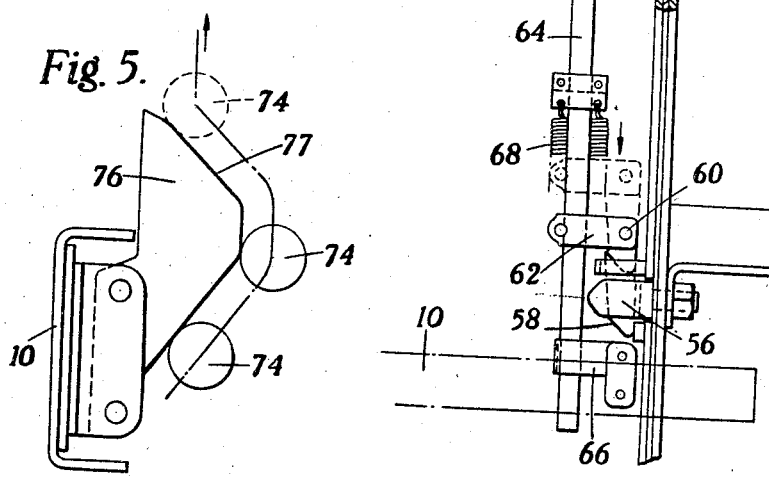
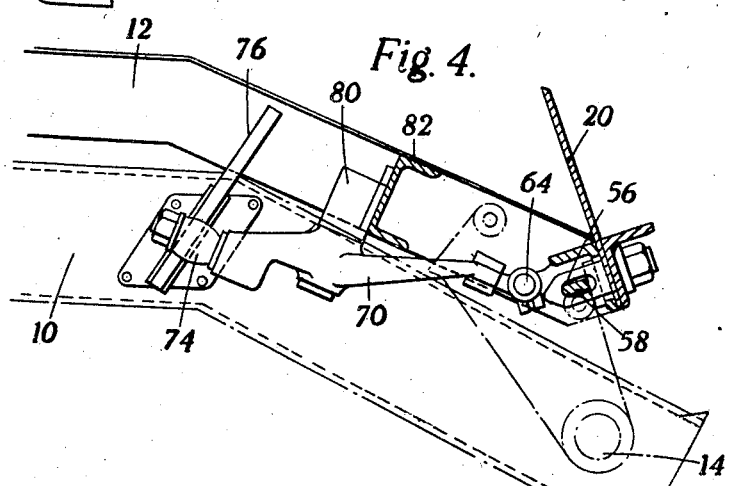
INVENTOR,
Charles Kearns Edwards
Frank S. Ackerman
ATTORNEY.

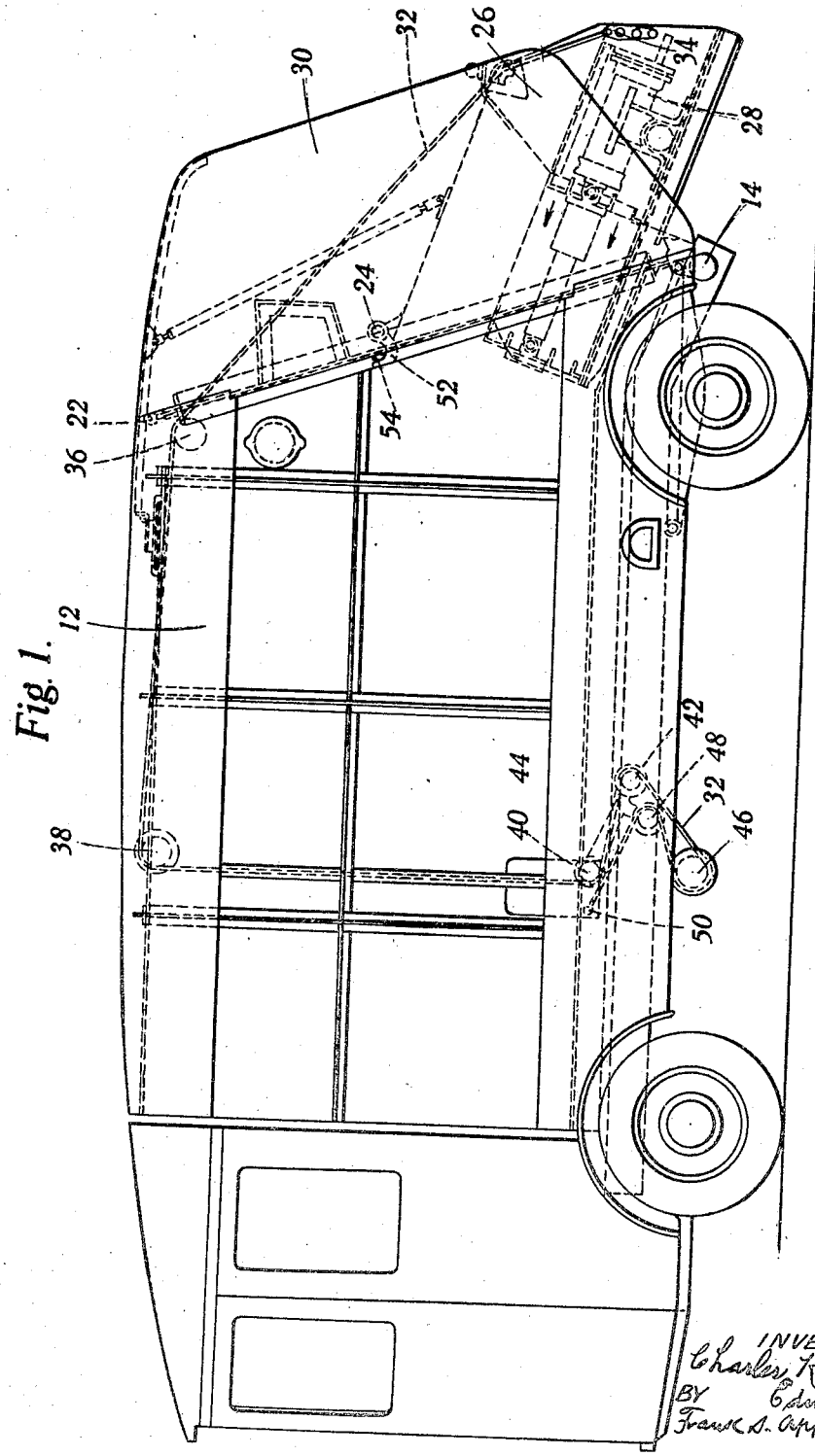

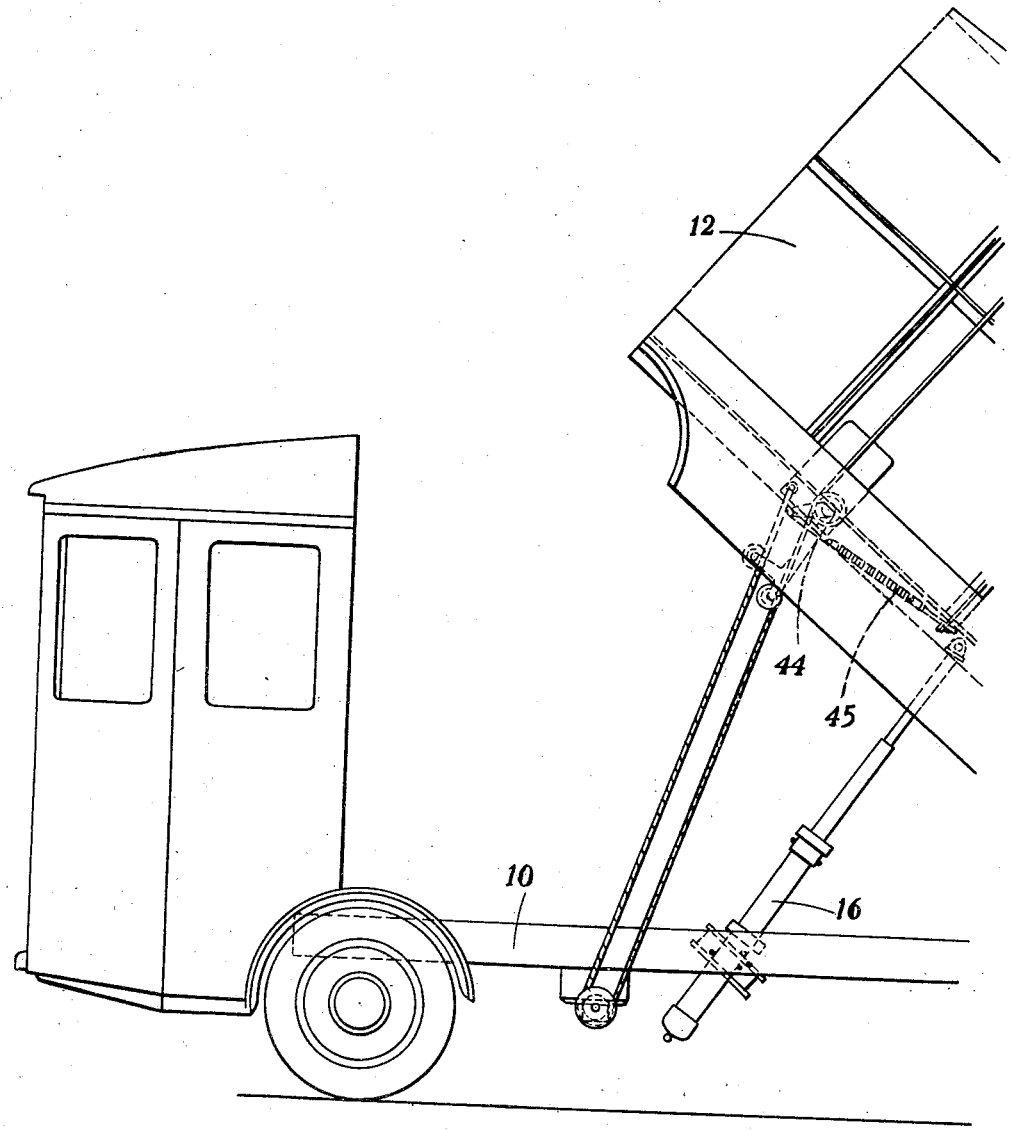

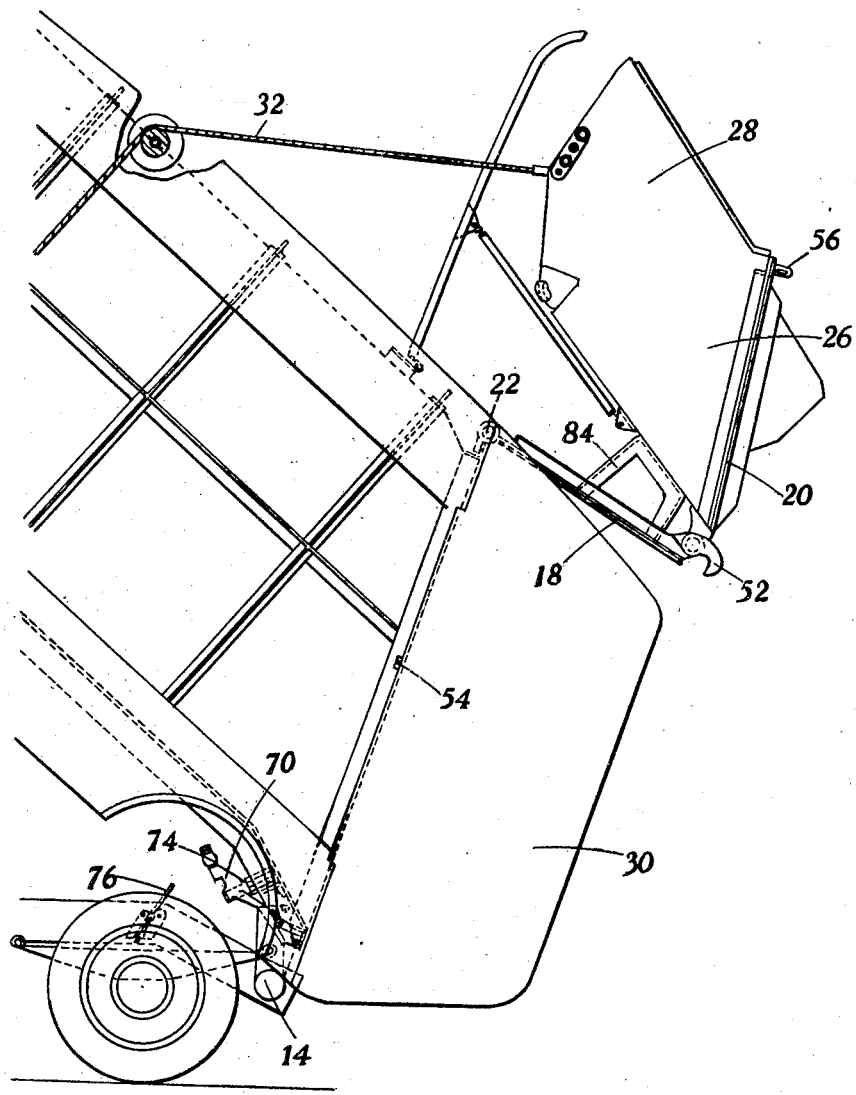

Patented Sept. 20, 1938

2,130,951

UNITED STATES PATENT OFFICE 2,130,951

LOADING APPARATUS FOR VEHICLES

Charles Kearns Edwards, London, England, assignor to Fernand Rey, Seine et Oise, France Application May 3, 1937, Serial No. 140,502
In Great Britain May 2, 1936

8 Claims. (Cl. 214—67)

(Granted under the provisions of sec. 14, act of March 2, 1927; 357 O. G. 5)

This invention relates to apparatus for loading solid, pasty or semi-solid material into a tank or receptacle mounted upon a vehicle, such apparatus comprising a loading hopper and a ramming device carried by the lower part of one wall of the tank or receptacle which wall is hinged to constitute a door which can be swung out to allow the contents of the tank or receptacle to be discharged. An example of such apparatus is described in the specification of British Letters Patent No. 424,396 with reference to Figures 9, 10 and 11.

It is the object of the present invention to minimize the space required for the swinging out or opening of this discharge door.

According to this invention the door is arranged to cover only a part of the open side of the receptacle and is provided with an extension carrying the loading apparatus and normally closing the remainder of the open side of the receptacle, this extension being movable upon the door towards and away from the hinge thereof. Thus, when the extension is moved towards the hinge and the door is swung out it will extend only about half as far from the vehicle as hitherto.

This saving of space is of particular importance when the apparatus is used for the collection and discharge of house or other refuse into a destructor or incinerator because these are usually so constructed as not to allow of any great overhang of the tipped-up tank or receptacle from which the material to be destroyed is discharged.

Referring to the accompanying drawings,

Figure 1 is a side elevation of a motor driven refuse collecting vehicle according to this invention, Figure 2 is a similar view showing the parts in the position for discharging refuse, Figure 3 is a plan partly in section of the rear part of the chassis of the vehicle, Figure 4 is a side elevation of the parts shown in Figure 3, and Figure 5 is a detail view looking in the direction of the arrow 5 in Figure 3.

Referring to Figures 1 and 2 the chassis 10 of the vehicle carries a tank or receptacle 12 which is hinged to the rear ends of the chassis frame longitudinals at 14 and is provided with a hydraulic ram 16 whereby the receptacle can be tipped into the position shown in Figure 2 to discharge its contents by gravity. The rear end of the receptacle is closed by a discharge door 18, hinged at 22 to the top of the receptacle about a horizontal axis and provided with an extension 20 hinged to the door about a horizontal axis at 24. The extension 20 carries a loading hopper 26 and a reciprocating hydraulic ramming apparatus indicated generally at 28, the details of which form no part of the present invention. The sides of the receptacle are extended rearwardly beyond the discharge opening by shields 30.

Cables 32 are attached to the loading hopper at its rear end 34. These cables are led over guide pulleys 36, 38 at the top of the container and from the pulleys 38 they extend down to pulleys 40 at the lower part of the receptacle, then over tensioning pulleys 42 mounted on spring-controlled arms 44, then over a pulley 46 mounted on the chassis, from those pulleys over further pulleys 48 mounted on the arms 44 and then to points 50 on the receptacle to which they are anchored. The pulleys 40 are coaxial with the pivotal axis of the arms 44.

The extension 20 of the discharge door is provided with a hook 52 which when the door is in the closed position engages behind catches 54 attached to the receptacle. When the parts are in the position shown in Figure 1 the extension of the door is locked to the receptacle by devices shown in Figures 2, 3 and 4. These devices consist of slotted lugs 56 attached to the extension near its lower end, cooperating with movable wedges 58 mounted on the receptacle. These wedges 58 are pivoted at 60 to brackets 62 fixed to a sliding bar 64 mounted in guides 66 secured to the receptacle and this bar is urged by springs 68 into the position shown in full lines in which the wedges 58 are engaged in the slots in the lugs 56. When in this position the wedges hold the door firmly in the closed position.

The bar 64 is moved into the position shown in dotted lines in Figure 3 by a lever 70 connected to the bar 64 by a link 72 and provided with a cam follower roller 74 cooperating with a cam plate 76 mounted on the chassis 10. The lever 70 is pivoted at 78 to a bracket 80 secured to a frame member 82 of the receptacle.

When the receptacle is in the position shown in Figures 1 and 4 the roller 74 is in the lowermost of the three positions shown in Figure 5 of the lever 70, the bar 64 and the wedges 58 are in the position shown in full lines in Figure 3. When the receptacle begins to tilt towards the position shown in Figure 2 the roller 74 is forced towards the left in Figure 5 into the position shown in dotted lines in Figure 3, thereby withdrawing the wedges 58 from the slotted lugs 56. During this time the tension in the cables 32 has caused the lever 44 to swing in the clockwise direction into the position shown in Figure 2 against the tension of the spring 48. When the wedges are clear of the slotted lugs the parts of the cable between the points 40 and 50 and the pulleys 46 have straightened out and further tilting movement of the receptacle will cause the extension 20 carrying the hopper 26 and the loading apparatus 28 to swing upwards about the hinges 24. This movement continues until the upper side of the loading hopper makes contact with stop members 84 mounted on the door 18. By this time the hook 52 has cleared the catches 54 and further tilting movement of the receptacle will cause the door to swing upwards and outwards about the hinges 22 until finally the position shown in Figure 2 is reached with the extension of the door folded backwards against the door and the door swung out. The whole of the cross-section of the receptacle at the back is now open and no part of the door and loading mechanism projects much beyond the rear edges of the shields 30. Thus, the receptacle can be tipped without risk of the door and the parts carried thereby coming into contact with any part of the destructor or with the receptacle into which the material is discharged.

From Figures 3, 4 and 5 it will be seen that the roller 74 returns to its full line position after the receptacle has tilted upwards some distance, but by this time the slotted lugs have swung rearwardly out of reach of the wedges 58. When the receptacle is lowered into the position shown in Figure 1 the cables 32 are paid out automatically and the door executes closing movements in the reverse order as will readily be understood. When the slotted lugs 56 approach the wedges 58 these are withdrawn by reason of the roller 74 riding over the upper slope 77 of the cam blade 76 and the final return of the parts to the full line position of Figure 3 is effected by the compression springs 68.

I claim:—

1. A vehicle comprising a receptacle one side of which is open for filling and discharge, a door hinged thereto and arranged to close a part of the open side of the receptacle, an extension of said door normally closing the remainder of the open side of the receptacle, a loading apparatus carried by said extension and means for moving said extension upon said door towards the hinge thereof whereby when the door is opened the extension does not project materially beyond the edge of the door.

2. A vehicle comprising a receptacle one side of which is open for filling and discharge, a door hinged thereto and arranged to close a part of the open side of the receptacle, an extension of said door normally closing the remainder of the open side of the receptacle and hinged to the free edge of said door, a loading apparatus carried by said extension, and means for swinging said extension about its hinges and folding it back upon the door.

3. A vehicle comprising a receptacle the rear side of which is open for filling and discharge, a door hinged to the top of said rear side and arranged to close the upper part of the rear side of the receptacle, an extension of said door normally closing the remainder of the open side of the receptacle, a loading apparatus carried by said extension, and means for moving said extension upwardly upon said door whereby when the door is opened the extension does not project materially beyond the edge of the door.

4. A vehicle comprising a receptacle the rear side of which is open for filling and discharge, a door hinged to the top of said rear side and arranged to close the upper part of the rear side of the receptacle, an extension of said door hinged to the lower edge thereof and normally closing the remainder of the open side of the receptacle, a loading apparatus carried by said extension, and means for swinging said extension upwardly about its hinges and folding it back upon the door.

5. A vehicle comprising a receptacle one side of which is open for filling and discharge, tipping mechanism therefor, a door hinged thereto and arranged to close a part of the open side of the receptacle, an extension of said door normally closing the remainder of the open side of the receptacle, a loading apparatus carried by said extension, and a connection comprising cables between the tipping mechanism and the extension of the door adapted to cause the extension to move upon the door towards the hinge thereof and also to cause the door to be opened as a consequence of the tipping of the receptacle.

6. The invention of claim 5 in combination with means for locking the door to the receptacle and mechanism associated therewith actuated automatically to unlock the door as a conseqeunce of the tipping of the receptacle.

7. The invention of claim 5 in combination with means for locking the door to the receptacle, mechanism associated therewith actuated automatically to unlock the door as a consequence of the tipping of the receptacle and resiliently mounted tensioning means for taking up initial slack in the aforesaid cables whereby the locking means is released before the cables are fully tensioned to open the door.

8. The invention of claim 5 in combination with means for locking the door to the receptacle comprising bolts movable into and out of engagement with eyes, and mechanism for moving the bolts out of engagement with the eyes as a consequence of the tipping of the receptacle, said mechanism comprising a cam carried by the chassis frame of the vehicle and a cam follower co-operating therewith and carried by the receptacle.

CHARLES KEARNS EDWARDS.